United States Patent Office

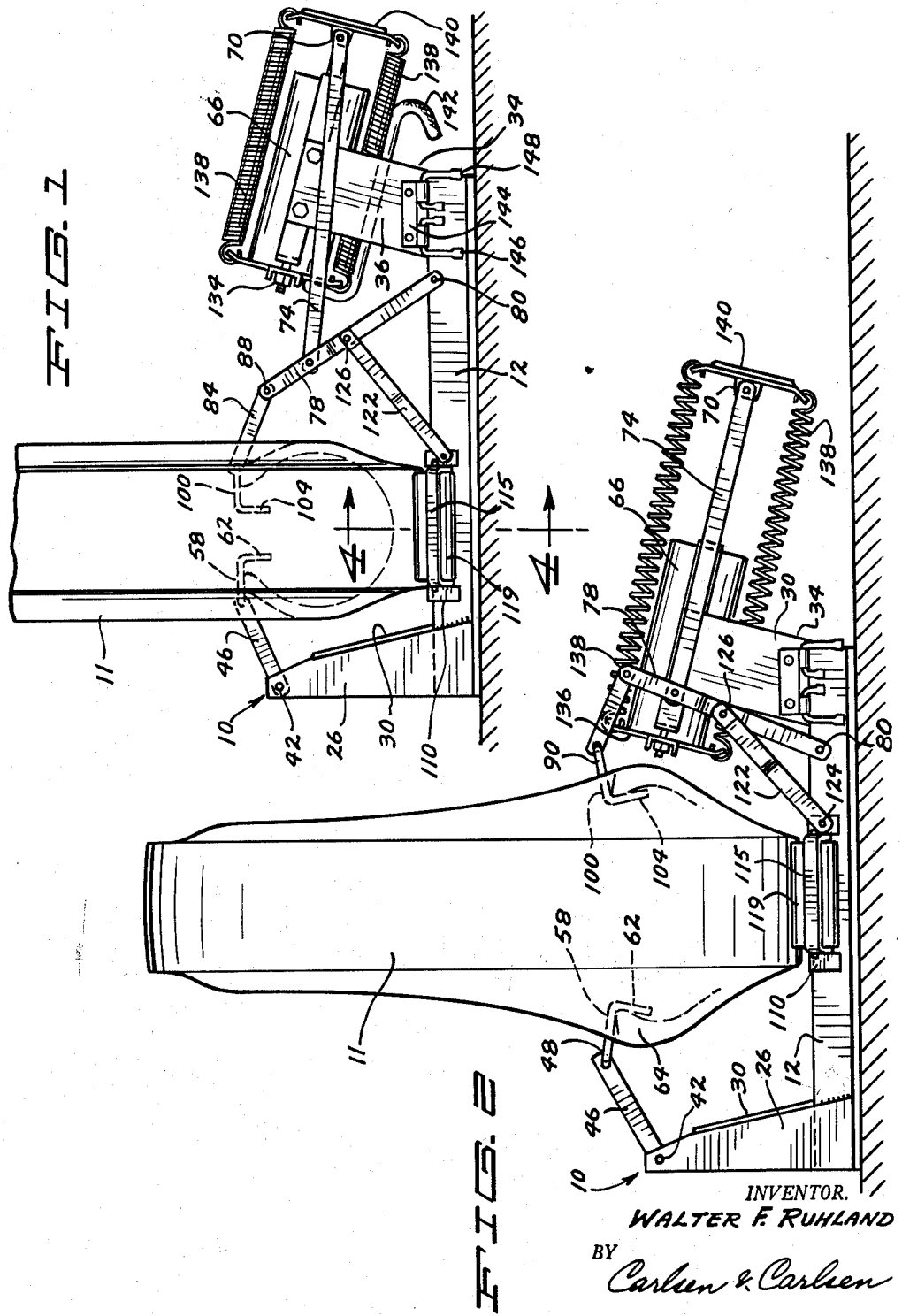

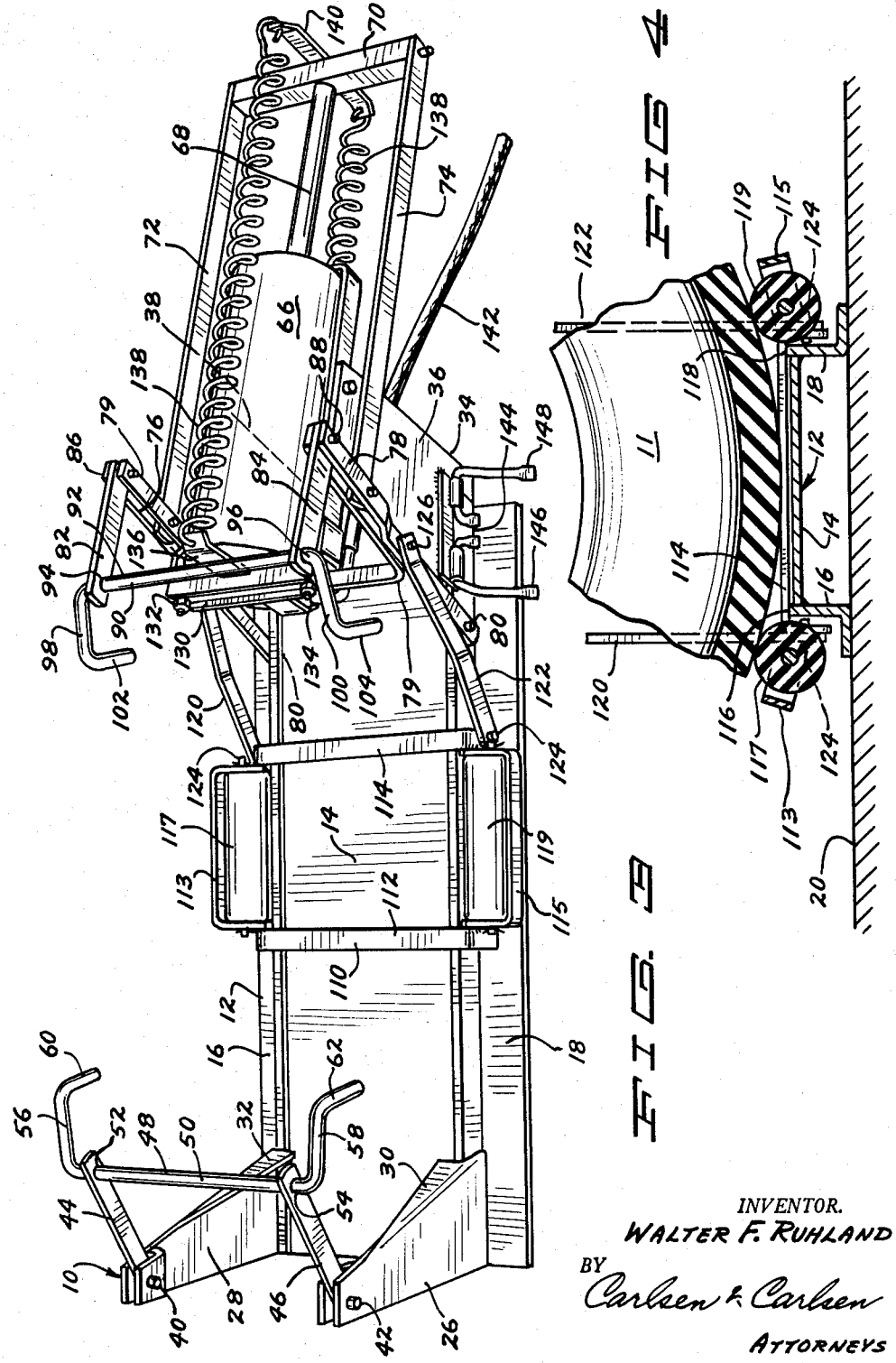

3,097,825
Patented July 16, 1963

3,097,825
TIRE SPREADER
Walter F. Ruhland, Shakopee, Minn., assignor to Bishman Manufacturing Company, Osseo, Minn., a corporation of Minnesota
Filed Apr. 4, 1961, Ser. No. 100,695
4 Claims. (Cl. 254—50.3)

This invention relates to tire repair equipment, and more particularly to tire spreaders.

Several devices have been previously proposed for spreading apart the walls of a tire in order to facilitate repair of the tire. One example of such a device is shown in the patent to Marks, No. 2,821,361. A number of shortcomings are, however, present in these prior devices. One important requirement of such devices is that the force exerted by the pressure means be transmitted efficiently to the spreader hooks which engage and spread the tire. Another requirement is that the tire be maintained in a vertical position during the opening or spreading apart of the walls thereof.

Due to the great size and bulk of some tires, such as those used on trucks and buses, a considerable effort is required in handling them. It is, therefore, desirable to provide means for making it unnecessary to lift the tire onto the work table of the tire spreader.

One problem inherent in tire spreaders is the problem caused by dirt, and other foreign material falling from the tire onto the moving parts of the apparatus. This material when allowed to accumulate on bearing surfaces between moving parts will result in abrasion and excessive friction between these parts.

Still another problem in prior art devices results from the fact that the force required to separate the walls of the tire increases as the walls are spread. Thus, as the tire walls are separated, the increasing resistance exerted by the tire will cause the pneumatic cylinder or other pressure devices to become increasingly less effective.

It is another requirement in such tire spreading devices that the tire be easily rolled onto the work table but yet be readily rotatable once positioned on the worktable so that different sections of the tire can be presented to the spreader means.

Still another requirement of such tire spreaders is that they be readily adjustable to fit tires of various sizes including those used on small sports cars as well as large tires such as those used on trucks and buses.

It is therefore an important object of the present invention to provide an improved tire spreader wherein the force exerted by the pneumatic cylinder or other pressure means will be transmitted efficiently to the tire engaging means.

It is still another object of the present invention to provide an improved tire spreader having means for maintaining the tire upon which work is being performed in a vertical position as the walls of the tire are spread apart.

It is another object of this invention to provide an improved tire spreader wherein the worktable, adapted to receive the tire is close enough to the floor so that the tire need not be lifted in placing it on the worktable.

It is yet another object of the present invention to provide an improved tire spreader having means to prevent dirt or other foreign material from accumulating on bearing surfaces between moving parts of the apparatus.

It is still another object of the present invention to provide an improved tire spreader which will exert a gradually increasing force on the tire as the walls of the tire are spread apart.

It is yet another object of the present invention to provide an improved tire spreader having means for permitting the tire to be readily rolled onto the worktable of the spreader and also being readily adjustable to fit tires of different sizes.

These and other more detailed and specific objects will be disclosed in the course of the following specification, reference being had to the accompanying drawings, in which—

FIG. 1 is a side elevation of the apparatus according to the present invention as it appears before the walls of the tire are spread apart.

FIG. 2 is a view similar to FIG. 1 as it appears after the walls of the tire are spread apart.

FIG. 3 is a perspective view of the apparatus of FIGS. 1 and 2 and,

FIG. 4 is a partial sectional view taken along line 4—4 of FIG. 1.

Briefly stated, the present invention provides a tire spreader having a frame, brace members on the frame, a first tire engaging means at one end of the frame, a pressure means supported upon the frame and a second tire engaging means connected to the pressure means. A tire support carriage is preferably slidably mounted on the frame for movement along an axis extending between the ends of the frame and a linkage means is operatively connected between the carriage and the pressure means.

Referring now to the figures which illustrate a preferred form of the present invention, there is shown a tire spreader 10 having a base or frame 12 formed from a flat rectangular elongate metal plate 14 and a pair of support members such as angle irons 16 and 18 rigidly connected to the side edges thereof. Members 16 and 18 support the center member 14 a slight distance above the floor 20.

At the left end of the frame, as shown in the FIGS. 1, 2 and 3, is provided a first brace means rigidly connected to the frame 12 and extending upwardly therefrom. The brace means comprises a pair of brace members 26 and 28 which are both rigidly attached to the frame member 12 at the lower ends thereof as by welding. The members 26 and 28 are preferably tapered somewhat toward the upper end thereof. Each of the members 26 and 28 is provided with reenforcing members designated 30 and 32 respectively to aid in securely retaining the brace members in position on the frame 12. Opposite the first brace means is provided a second brace means 34 secured rigidly at the lower end thereof to the end of frame 12 opposite the first brace. Brace means 34 includes first and second brace members designated 36 and 38 respectively. Members 36 and 38 may be attached to the frame 12 by any suitable means as by welding.

Movably connected to the upper end of the first brace means is a first tire engaging means. The first tire engaging means includes links 44 and 46 which are pivotally connected to the upper end of members 26 and 28 by means of coaxial pivots 40 and 42 respectively. Rigidly connected to the other end of link members 44 and 46 is a tire engaging hook 48. The hook member 48 comprises a rod having a center portion 40 which is rigidly secured in openings 52 and 54 at the ends of link members 44 and 46 respectively. Laterally of each end of members 44 and 46 the hook 48 extends centrally at 56 and 58. The extreme ends of hook 48 extend downwardly at 60 and 62. During use, portions 60 and 62 extend within the tire 11 and engage the inside edge of the bead 64 of the tire.

At the upper end of members 36 and 38 is rigidly attached a pressure means such as hydraulic cylinder 66. As shown in the figures, the bracket members 36 and 38 are inclined outwardly. Cylinder 66 is consequently inclined upwardly so that the central end thereof is elevated above the outer end. The purpose for this provision will be explained hereinbelow.

Slidably mounted within the cylinder 66 is a movable pressure element such as a piston (not shown). The piston has connected thereto a piston rod 68 which extends out through the outer end of cylinder 66. At the outer end of connecting rod 68 there is secured a horizontally disposed cross member 70. The ends of member 70 extend laterally beyond the side edges of cylinder 66. Pivotally connected to the ends of cross member 70 are a pair of connecting links 72 and 74.

Connected to the central end of cylinder 66 is a horizontally disposed bracket member 130. Bracket member 130 can be secured to the cylinder 66 conveniently by bolts 132 and 134. As best seen in FIG. 3, there is secured to cylinder 66 by bracket 130 a vertically disposed spring support 136. Spring support 136 has connected at each end thereof a spring designated 138. The other ends of springs 138 are connected to a vertically disposed spring support 140 affixed rigidly to cross member 70. The springs 138 thus aid in returning the carriage, linkage members and tire engaging member 90 to the retracted position as shown in FIG. 1.

The ends of connecting links 72 and 74 are pivotally connected at the opposite ends thereof near the upper ends of a lever means comprising levers 76 and 78. Levers 76 and 78 are pivotally connected at their lower ends by pivots 80 to the frame member 12. Rigidly connected between link members 76 and 78 by means of pins 86, 88, 89 and 91 is a U shaped connected member 79. Member 79 helps to assure that the levers 76 and 78 move together as a unit. Movably connected to the upper ends of links 76 and 78 is a second tire engaging means comprising a pair of links 82 and 84 and a second tire engaging hook 90. Links 82 and 84 are preferably pivotally connected by means of coaxial pivots 86 and 88 to the ends of links 76 and 78 respectively.

The tire hook 90 is generally similar in construction to hook 48 and includes a central portion 92 secured rigidly at one end within opening 94 of link 82 and secured rigidly at the other within opening 96 of link 84. Member 90 includes two inwardly extending portions 98 and 100 and at the ends thereof two downwardly extending portions 102 and 104. Portions 102 and 104 extend within tire 11 and engage the inner surface of the bead 64 of tire, as shown in FIGS. 1 and 2.

Slidably mounted for movement across the top of frame member 12 along an axis extending between the first brace means 26, 28 and the second brace means 36, 38 is a tire platform or carriage 110. The carriage 110 comprises a pair of bars 112 and 114, which extend laterally cross the top of plate 14 and rest slidably adjacent each of the upper edges of members 16 and 18. As can be seen in FIG. 4, the upper edges 116 and 118 of members 16 and 18 respectively project upwardly beyond the top of frame member 14. These upper edges 116 and 118 comprise a bearing surface upon which the carriage 110 will slide when the apparatus is being used.

The ends of carriage members 112 and 114 are bent downwardly over the sides of frame members 16 and 18 and are secured rigidly at their ends to a pair of U shaped traction members 113 and 115. These U shaped members or bars may be secured to members 112 and 114 at each end by any suitable fastening means as, for example, by welding. A pair of rollers 117 and 119 are rotatably mounted on the carriage between the U shaped members 113 and 115 and the frame members 16 and 18.

A linkage means comprising links 120 and 122 is provided to operatively connect the carriage 110 and the levers 76 and 78. Each of links 120 and 122 are pivotally connected between the carriage 110 and the levers 76 and 78. The pivotal connections between the links 120 and 122 and carriage 110 are designated 124 and the pivotal connections at the other end thereof are designated 126. The pivots 126 are preferably positioned on the levers 76 and 78 at a point half way between the pivotal connections with the lever members 72 and 74 and the pivotal connection 80 between the levers and the frame 12.

Thus, at best shown in FIGS. 1 and 2, when the piston and connecting rod 68 of cylinder 66 are moved to the right, the carriage 110 slides along an axis extending substantially parallel to the axis of movement of the piston but will move approximately half the distance that the piston moves. For this reason, as best seen in FIG. 2, the tire 11 will remain in a vertical position as the side walls thereof are spread apart.

Compressed air for operating the cylinder 66 is supplied through line 142. A control means or valve 144 controls the passage of air into and out of the cylinder 66. A first control lever 146 can be used to exhaust the air from cylinder 66 while a second control lever 148 can be used to admit air into cylinder 66.

When the apparatus is to be used, a tire requiring repair is rolled to the side of the carriage 110 and placed in the position shown by dotted line 131. The tread of the tire then engages the traction bar 113 enabling the tire to be easily rolled onto the carriage. Once on the carriage, the tire can be readily rotated to the position desired, since it is supported solely by rollers 117 and 119. The tire engaging hooks 48 and 90 are then positioned within the tire as shown in FIG. 1 and air is admitted to the cylinder 66 by depressing valve lever 148. The piston, connecting rod 68, links 72 and 74, levers 76 and 78, tire hook 90 and the right side of the tire then moves outwardly while the left side of the tire 11 is held in its original position by hook 48. As can be seen, the carriage 110 also moves in the same direction as the levers 76, 78 and hook 90, but since it is connected to levers 76 and 78 at a point closer to pivot 80 than the hook 90, it moves a lesser distance. To maintain the tire in a vertical position throughout the operation, I connect the links 120 and 122 to levers 76 and 78 at a point exactly half way between the pivotal connection between levers 76 and 78 and the frame and the connection between these levers and the tire hook 90.

It should be noted that as the carriage 110 slides on the bearing surfaces 116 and 118, the members 112 and 114 will cause any dirt and mud which has fallen on these surfaces to be pushed aside, thereby reducing wear and consequent excessive friction between these parts. These bearings may therefore be thought of as self-cleaning.

It will also be noted that the force exerted by cylinder 66 is aligned axially with the path of movement of the hook 90. For this reason, the force exerted by the cylinder will be transmitted efficiently to the hook, only a minor amount of power being lost through friction in the pivots between linkage members. Moreover, as the tire walls are spread farther apart, tire hook 90 will move a smaller proportion of the distance than the piston moves, thereby increasing the effective power of the pressure means to compensate for the increasing resistance offered by the tire.

By mounting the cylinder 66 at a slightly inclined angle, as described above, the force exerted by the hook 90 will be greatest when the walls of the tire are spread fully apart. For these reasons, tire spreaders according to the present invention can handle larger tires than prior devices of the same size. They can therefore be made smaller for tires of the same size and even then will operate at a greater speed. Furthermore, there is no tendency for parts to jam or bind during operation.

A number of these devices have been manufactured and sold. They were immediately accepted by the trade and proved to be rugged in construction, efficient in operation and economical to manufacture.

It is understood that suitable modifications may be made in the structure as disclosed, provided such modifications come within the spirit and scope of the appended claims.

Having now therefore fully illustrated and described my invention, what I claim to be new and desire to protect by Letters Patent is:

1. A tire spreading apparatus comprising a low frame, a first bracket at one end of said frame, said first bracket extending upwardly therefrom, a second bracket on the end of said frame opposite said first bracket, a first tire hook pivotally connected at the upper end of said first bracket for pivotal movement about a horizontal axis, said first tire hook being adapted to extend into said tire and engage the inner edge of a portion of one bead of said tire thereby securely retaining said bead in a fixed position with respect to said frame, a pressure means affixed to the upper end of said second bracket, said pressure means having a movable pressure element operatively associated therewith, said pressure element being movable along a path extending away from said first brace and said second brace, lever means pivotally connected to said frame adjacent said second brace, said lever means extending upwardly from said frame, a first linkage means pivotally connected between said movable pressure element and said lever means whereby the upper end of said lever means is caused to move in the same direction as said pressure element, a second tire engaging means operatively connected to said movable pressure element, a tire support carriage mounted on said frame for sliding movement between said first and second brace, a means on said carriage to permit said tire to be easily rotated, a second linkage means connecting said carriage and said lever means, said second linkage means being pivotally attached to said lever means at a point intermediate the pivotal connection between said frame and said lever and the connection between said lever and said second tire engaging means.

2. A tire spreader according to claim 1 wherein the path of movement of said pressure element is inclined at a small angle with respect to said frame, the inner end thereof being elevated above the outer end thereof whereby the effective force exerted by said pressure means on said tire is greatest when the walls of said tire are spread fully apart.

3. A tire spreading apparatus comprising a frame, tire engaging means attached to one end of said frame for securely retaining a portion of one bead of said tire in a fixed position with respect to said frame, a pressure cylinder affixed to the end of said frame opposite said first tire engaging means, said pressure cylinder having a movable pressure element operatively associated therewith, said movable pressure element being adapted to move along a path extending away from said first tire engaging means and said pressure cylinder, vertically disposed lever means pivotally connected at the lower end thereof to said frame, a second tire engaging means connected to the upper end of said lever means for gripping a portion of the other bead of said tire opposite said one bead, a first linkage means pivotally connected at one end thereof to said lever means and pivotally connected at the other end thereof to said pressure element whereby outward movement of said pressure element is adapted to cause pivotal movement of said lever means and the second tire engaging means with respect to said frame thereby spreading apart the walls of said tire, said apparatus being provided with horizontally disposed roller means mounted for rotation on an axis extending in the direction of movement of said second tire engaging means whereby said tire may be readily rotated when said pressure element and second tire engaging means are moved to a retracted position, said roller means being mounted upon a tire support carriage, said tire support carriage being mounted on said frame for sliding movement in the direction of movement of said second tire engaging means, a second linkage means connecting said lever means and said carriage whereby said carriage is caused to slide on said frame in the direction of movement of said lever means and said second tire engaging means, said second linkage means being connected to said lever means at a point halfway between the pivot at the lower end of said lever means and the pivotal connection between said lever means and said second tire engaging means whereby said carriage is caused to move half the distance that the second tire engaging means moves as the tire walls are spread apart thereby retaining said tire in a vertical position throughout operation.

4. A tire spreading apparatus comprising a frame, tire engaging means attached to one end of said frame for securely retaining a portion of one bead of said tire in a fixed position with respect to said frame, a pressure cylinder affixed to the end of said frame opposite said first tire engaging means, said pressure cylinder having a movable pressure element operatively associated therewith, said movable pressure element being adapted to move along a path extending away from said first tire engaging means and said pressure cylinder, vertically disposed lever means pivotally connected at the lower end thereof to said frame, a second tire engaging means connected to the upper end of said lever means for gripping a portion of the other bead of said tire opposite said one bead, a first linkage means pivotally connected at one end thereof said lever means and pivotally connected at the other end thereof to said pressure element whereby outward movement of said pressure element is adapted to cause pivotal movement of said lever means and said second tire engaging means with respect to said frame thereby spreading apart the walls of said tire, a tire support carriage, said tire support carriage being mounted on said frame for sliding movement in the direction of movement of said second tire engaging means, a second linkage means connecting said lever means and said carriage whereby said carriage is caused to slide on said frame in the direction of movement of said lever means and said second tire engaging means, said second linkage means being connected to said lever means at a medial point between the pivot at the lower end of said lever means and the connection between said lever means and said second tire engaging means.

References Cited in the file of this patent
UNITED STATES PATENTS

| | | |
|---|---|---|
| 2,347,311 | Branick | Apr. 25, 1944 |
| 2,821,361 | Marks | Jan. 28, 1958 |
| 2,855,180 | Douglass | Oct. 7, 1958 |